US011243801B2

(12) United States Patent
Tsirkin et al.

(10) Patent No.: US 11,243,801 B2
(45) Date of Patent: Feb. 8, 2022

(54) TRANSPARENT HUGE PAGES SUPPORT FOR ENCRYPTED VIRTUAL MACHINES

(71) Applicant: Red Hat, Inc., Raleigh, NC (US)

(72) Inventors: Michael Tsirkin, Lexington, MA (US); Andrea Arcangeli, Imola (IT)

(73) Assignee: Red Hat, Inc., Raleigh, NC (US)

(*) Notice: Subject to any disclaimer, the term of this patent is extended or adjusted under 35 U.S.C. 154(b) by 112 days.

(21) Appl. No.: 16/831,268

(22) Filed: Mar. 26, 2020

(65) Prior Publication Data
US 2021/0303326 A1   Sep. 30, 2021

(51) Int. Cl.
*G06F 9/455* (2018.01)
*G06F 12/1009* (2016.01)

(52) U.S. Cl.
CPC ...... *G06F 9/45558* (2013.01); *G06F 9/45545* (2013.01); *G06F 12/1009* (2013.01); *G06F 2009/4557* (2013.01); *G06F 2009/45583* (2013.01); *G06F 2009/45591* (2013.01)

(58) Field of Classification Search
CPC ............ G06F 9/45558; G06F 9/45545; G06F 12/1009; G06F 2009/45583; G06F 2009/45591; G06F 2009/4557
See application file for complete search history.

(56) References Cited

U.S. PATENT DOCUMENTS

| 10,296,465 | B2 | 5/2019 | John et al. |
| 10,430,327 | B2 | 10/2019 | Tsirkin |
| 2007/0283125 | A1* | 12/2007 | Manczak ............ G06F 11/3466 711/207 |
| 2009/0216964 | A1* | 8/2009 | Palladino ............... G06F 13/28 711/154 |
| 2014/0181461 | A1 | 6/2014 | Kegel et al. |
| 2015/0212948 | A1* | 7/2015 | Tsirkin ................ G06F 9/45558 711/6 |
| 2019/0121751 | A1 | 4/2019 | Bennett et al. |

OTHER PUBLICATIONS

Kwon et al., "Ingens: Huge Page Support for the OS and Hypervisor", 2017, 11 pages, https://www.cs.utexas.edu/users/witchel/pubs/kwon17osr-ingens.pdf.

(Continued)

*Primary Examiner* — Dong U Kim
(74) *Attorney, Agent, or Firm* — Lowenstein Sandler LLP

(57) ABSTRACT

Systems and methods for memory management for virtual machines. An example method may comprise determining that a first memory page and a second memory page are mapped to respective guest addresses that are contiguous in a guest address space of a virtual machine running, wherein the first memory page is mapped to a first guest address, determining that the first memory page and the second memory page are mapped to respective host addresses that are not contiguous in a host address space of the host computer system, tracking modifications of the first memory page, causing the virtual machine to copy the first memory page to a third memory page, such that the third memory page and the second memory page are mapped to respective contiguous host addresses, and in response to determining that the first guest page has not been modified, mapping the first guest address to the third memory page.

20 Claims, 6 Drawing Sheets

(56) References Cited

OTHER PUBLICATIONS

Xia et al., "Architecture Support for Guest—Transparent VM Protection from Untrusted Hypervisor and Physical Attacks" 2013, 12 pages, http://class.ece.iastate.edu/tyagi/cpre581/papers/HPCA13VMProtection.pdf.

Sanjay et al., "X-XEN : Huge Page Support in Xen", 2011, 6 pages, https://www.kernel.org/doc/ols/2011/ols2011-gadre.pdf.

Kwon et al., "Coordinated and Efficient Huge Page Management with Ingens", Nov. 2016, 19 pages, https://www.usenix.org/system/files/conference/osdi16/osdi16-kwon.pdf.

* cited by examiner

TRANSPARENT HUGE PAGES SUPPORT FOR ENCRYPTED VIRTUAL MACHINES

TECHNICAL FIELD

The present disclosure is generally related to virtualized computer systems, and more particularly, to transparent huge page support in encrypted virtualized computer systems.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
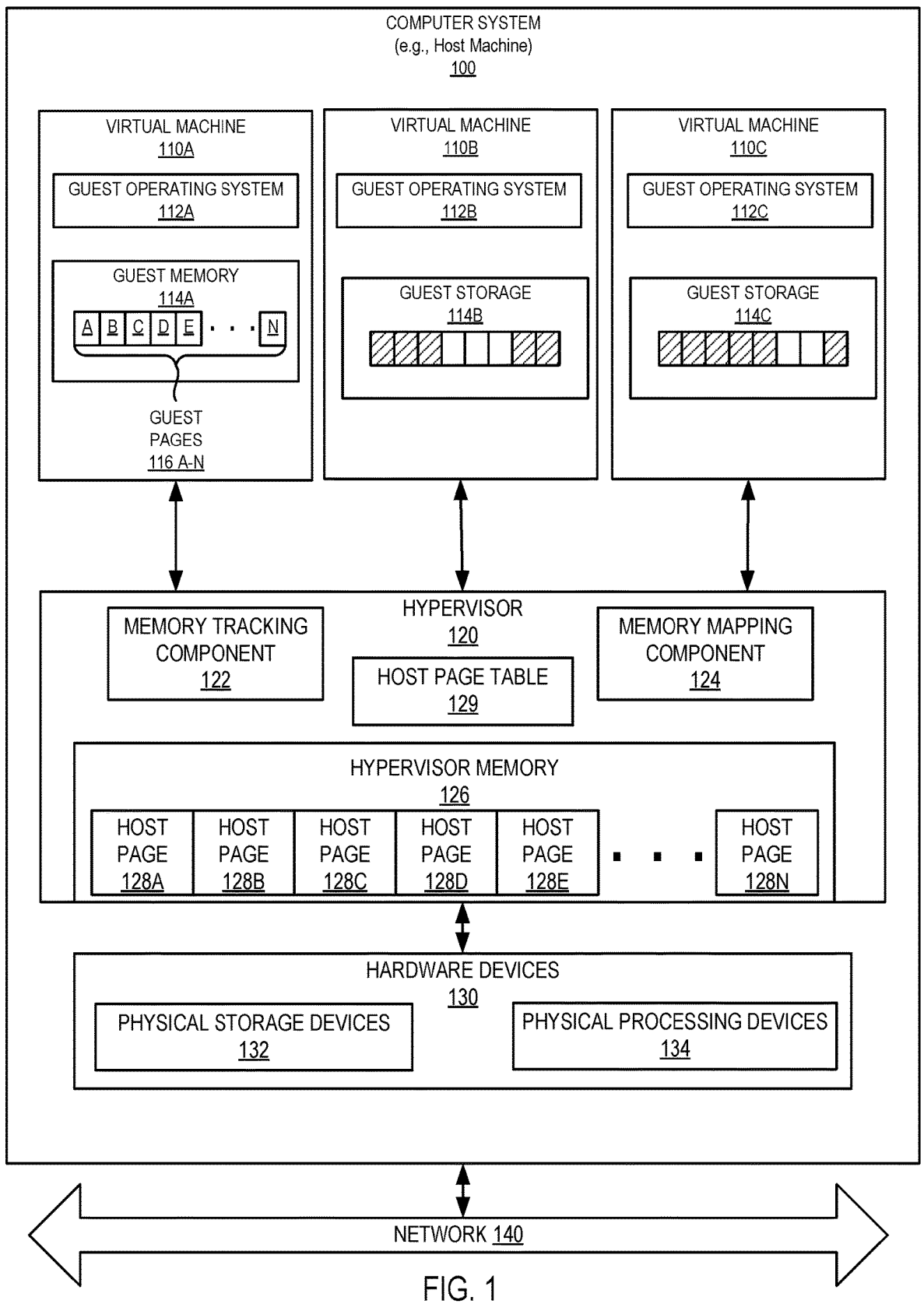
FIG. 1 depicts a high-level block diagram of an example host computer system that performs hypervisor memory management for virtual machines, in accordance with one or more aspects of the present disclosure.

Described herein are systems and methods for transparent huge page support for encrypted virtual machines.

Transparent huge pages (THP) is a virtualization technology that may improve virtualized computer system performance by 10% or more in certain workloads. THP are a memory management system that reduces the overhead of Translation Lookaside Buffer (TLB) lookups on virtualized computer systems with large amounts of memory by using larger memory pages. This memory management system works by rearranging memory pages such that pages with consequent guest physical addresses also have consequent host physical addresses. Multiple pages collectively forming a "huge page" can then be mapped by a single page table entry. This reduces the amount of page table walks and space in the TLB page tables used by a virtual machine (VM).

Computer systems often use cryptographic functions to encrypt data stored within a storage device. The cryptographic functions often use variations in cryptographic input to enhance security and cause multiple instances of identical content to appear different once encrypted. Some cryptographic systems provide this variation by using a cryptographic key that is based on hardware embedded information of the data storage device. For example, a cryptographic key may be based on the physical address where the data is stored. This may enhance security but may cause the data to become inaccessible when moved. This may be problematic for executable code performing storage management functions because the storage management functions may be responsible for moving and organizing the data to optimize access to the data. In a virtualized computer system, a hypervisor may perform storage management functions for one or more virtual machines. In the past, the hypervisor was typically provided with the ability to decrypt the data so that the hypervisor could move the data within the data storage device, but this may present a security vulnerability if the hypervisor is compromised.

However, rearranging memory pages in an encrypted VM is not possible, because in encrypted VMs, memory is encrypted with a location-specific key. This makes it impossible for a hypervisor to move data between host memory pages.

Aspects of the present disclosure address the above and other deficiencies by providing technology that enhances the memory management of virtualized computer systems. In particular, aspects of the present disclosure provide technology that may analyze a host page table to identify one or more memory pages that are contiguous in a guest memory and not contiguous in the host memory. In an example, memory page A residing at a first host address can be mapped to first guest address, and memory page B can be mapped to a second guest address and to a second host address, where the first guest page and the second guest page are contiguous (e.g., the first guest address and the second guest address are contiguous), and the first host page and the second host page are not contiguous (e.g., the first host address is not contiguous to the second host address). The hypervisor may then determine whether memory page C that is mapped to a third host address is contiguous to either the first host address or the second host address is available. In an example, memory page C may be mapped to a host address contiguous to the second host address. The hypervisor may then track memory modifications of memory page A. The hypervisor may then cause the guest to copy the contents of memory page A to memory page C. The hypervisor may then, in response to determining that the first guest page has not been modified, map the first guest address to memory page C. As such, memory page C and memory page B are mapped to respective host addresses that are contiguous in a host address space, and respective guest addresses that are contiguous in a guest address space. Accordingly, aspects of the present disclosure allows a reduced amount of page table walks and space in the TLB used by encrypted VMs, thus improving speed and efficiency of the encrypted VMs.

Various aspects of the above referenced methods and systems are described in details herein below by way of examples, rather than by way of limitation. The examples provided below discuss a virtualized computer system where memory movement may be initiated by aspects of a hypervisor, a host operating system, a virtual machine, or a combination thereof. In other examples, the memory movement may be performed in a non-virtualized computer system that is absent a hypervisor or other virtualization features discussed below.

FIG. 1 depicts an illustrative architecture of elements of a computing device 100, in accordance with an embodiment of the present disclosure. It should be noted that other architectures for computing device 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include virtual machines 110A-C, hypervisor 120, hardware devices 130, and a network 140.

Virtual machines 110A-C may execute guest executable code that uses an underlying emulation of the physical resources. The guest executable code may include a guest operating system, guest applications, guest device drivers, etc. Each of the virtual machines 110A-C may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc. Virtual machines 110A-C may execute guest operating systems 112A-C that manage guest memory 114A-C respectively.

Guest memory 114A-C may be any virtual memory, logical memory, physical memory, other portion of memory, or a combination thereof for storing, organizing, or accessing data. Guest memory 114A-C may represent the portion of memory that is designated by hypervisor 120 for use by one or more respective virtual machines 110A-C. Guest memory 114A-C may be managed by guest operating system 112A-C and may be segmented into guest pages 116A-N, where N is a positive integer. Guest pages 116A-N may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values. Each of the guest pages 116A-N may have a page size that is the same or different from the page size of an adjacent memory page. In one example, guest pages 116A-N may be memory blocks of a volatile or non-volatile memory device and may each correspond to an individual memory block, multiple memory blocks, or a portion of a memory block. Page sizes may have a standard size (e.g., page size of 4 KB) and may have an enlarged size (e.g., page size of 2 MB), which may be referred to as "huge pages."

Hypervisor memory 126 (e.g., host memory) may be the same or similar to the guest memory but may be managed by hypervisor 120 instead of a guest operating system. Hypervisor memory 126 may include host pages 128A-N, which may be in different states. The states may correspond to unallocated memory, memory allocated to guests, and memory allocated to hypervisor. The unallocated memory may be host memory pages that have not yet been allocated by hypervisor memory 126 or were previously allocated by hypervisor 120 and have since been deallocated (e.g., freed) by hypervisor 120. The memory allocated to guests may be a portion of hypervisor memory 126 that has been allocated by hypervisor 120 to virtual machines 110A-C and corresponds to guest memory 114A-C. Other portions of hypervisor memory may be allocated for use by hypervisor 120, a host operating system, hardware device, other module, or a combination thereof.

Hypervisor 120 may also be known as a virtual machine monitor (VMM) and may provide virtual machines 110A-C with access to one or more features of the underlying hardware devices 130. In the example shown, hypervisor 120 may run directly on the hardware of computing device 100 (e.g., bare metal hypervisor). In other examples, hypervisor 120 may run on or within a host operating system (not shown). Hypervisor 120 may manage system resources, including access to hardware devices 130. In the example shown, hypervisor 120 may include a memory tracking component 122, and a memory mapping component 124. Components 122 and 124 may each be separated into one or more components or may be included within the same component.

Memory tracking component 122 may analyze aspects of one or more memory pages (e.g., location, size, etc.) and may select one or more memory pages that may be remapped and moved to enhance the performance of the hypervisor memory 126. Memory tracking component 122 may determine and track when data is mapped to contiguous host addresses and guest addresses, and to not contiguous host addresses and guest addresses. Memory tracking component 122 may track memory modifications of one or more memory pages. Memory tracking component 122 may restrict access to a memory page before, during, or after the remapping and migration in order to avoid data being lost during the move. Memory tracking component 122 may interact with memory mapping component 124 to perform a data migration.

Memory mapping component 124 may copy one or more memory pages to one or more new locations, and map one or more existing guest addresses to the one or more new host addresses. For example, memory mapping component 124 may request virtual machine 110A-C to copy data from an existing memory page to a new memory page. Memory mapping component 124 may then determine whether virtual machine 110A-C has modified the existing memory page and, in response to determining that no modification was made, memory mapping component 124 may map one or more existing guest memory addresses to one or more new host memory addresses; otherwise, if the memory page was modified. The features of memory tracking component 122 and memory mapping component 124 are discussed in more detail below in regards to FIG. 2.

Hypervisor 120 may also include a host page table 129. A page table is a data structure used by hypervisor 120 to store a mapping of addresses of the guest memory 114A-C to addresses of the hypervisor memory. Accordingly, address translation is handled using the page table(s). Host page table 129 may include one or more page tables such as a protected host page table or an unprotected host page table. In an example, host page table 129 may be an extended page table ("EPT"), translating guest physical addresses to host physical addresses. In another example, the host page table may be the shadow page table translating the guest virtual addresses to host physical addresses. In another example, the host page table may be the hypervisor page table, translating the guest physical addresses to hypervisor virtual addresses.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
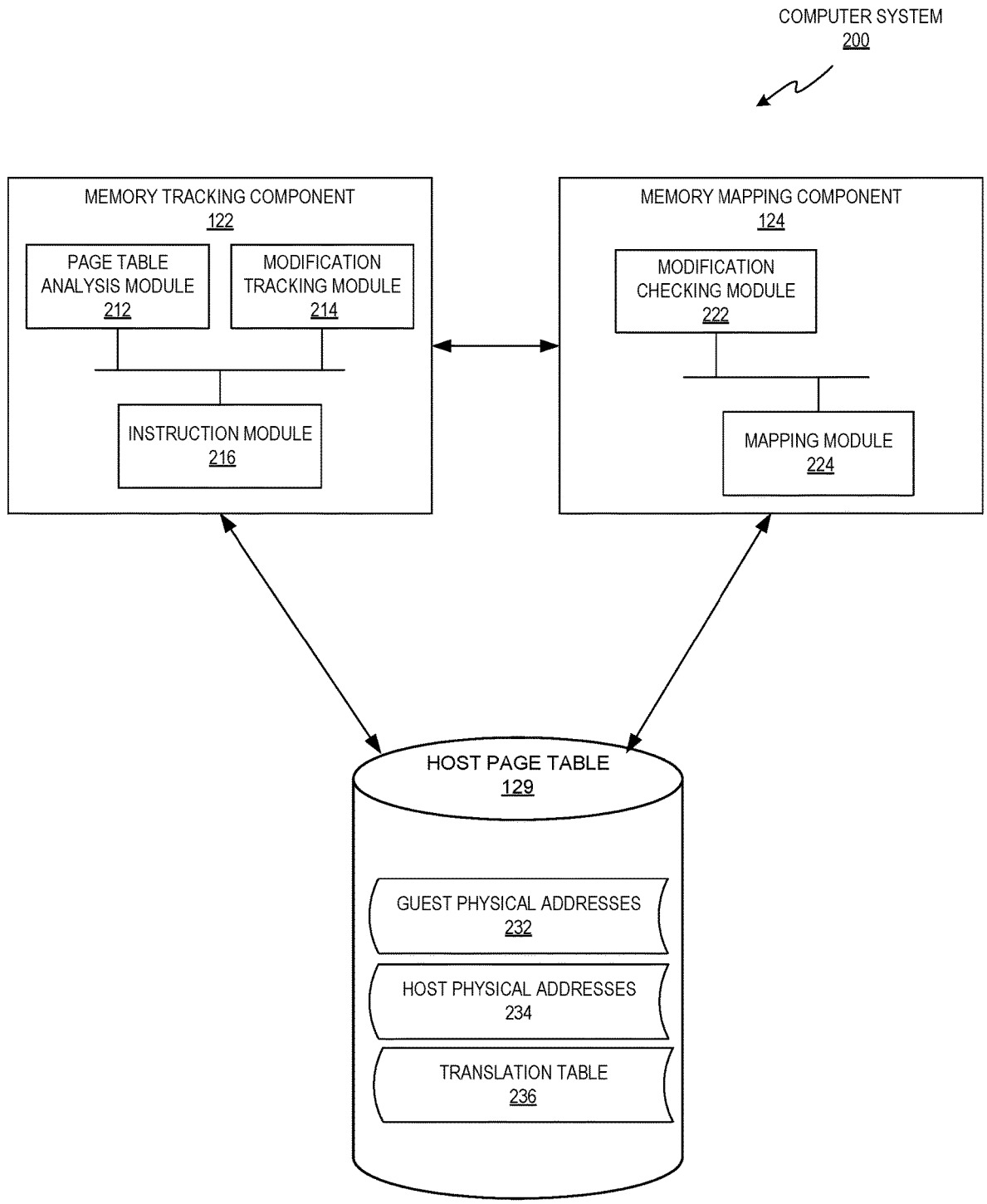
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include a memory tracking component 122 a memory mapping component 124.

Memory tracking component 122 may enable computer system 200 to analyze host page table 129 to identify host pages that may be re-organized to enhance the performance of computer system 200. As illustrated, memory tracking component 122 may include a page table analysis module 212, a modifications tracking module 214, and an instruction module 216.

Page table analysis module 212 may analyze host page table 129 to identify one or more memory pages that are contiguous in a guest memory (e.g., have contiguous addresses in the guest memory) and not contiguous in a host memory (e.g., have not contiguous addresses in the host memory). Page table analysis module 212 may use translation table 236 of the host page table 129 to determine which contagious guest physical addresses are mapped to non-contiguous host physical addresses. In an example, a first page of data (memory page A) can be mapped to a guest address associated with guest page 116B and to a host address associated with host page 128A, and a second page of data (memory page B) can be mapped to a guest address associated with guest page 116C and to a host address associated with host page 128D. As seen in FIG. 1, guest page 116B and guest page 116C are contiguous (e.g., have contiguous guest addresses), while host page 128A and host page 128D are not contiguous (e.g., do not have contiguous host addresses). Page table analysis module 212 may then determine whether an adjacent page is available (e.g., has a host address contiguous to either one of the host addresses of host pages 128A or 128D). In an example, page table analysis module 212 may determine that memory page C is mapped to host page 128C whose host address is contiguous to a host address of host page 128D, and is available. In an example, memory page C is mapped to the guest address associated with guest page 116E. It is noted that throughout the disclosure, when two or more memory pages are said to be contiguous, it means that their virtual or physical addresses are contiguous, and when two or more memory pages are said to be not contiguous, it means that their virtual or physical addresses are not contiguous.

The modifications tracking module 214 may track memory modifications of memory page A. Tracking the memory modifications of a memory page may allow the hypervisor to detect if an encrypted page is modified during the attempt to migrate data from the first page to the third page. In an example, the modifications tracking module 214 may set the dirty flag of memory page A in host page table 129. The dirty flag may indicate whether the guest memory page has been modified after it was read from the backing storage. Specifically, the dirty bit is set when the memory page is written to. The dirty identifier indicates that the memory page has been modified and has not been saved to the backing storage yet. When memory pages are to be replaced, dirty identifiers are checked to see if the memory pages needs to be written back to a physical storage device before being replaced or if the memory pages can simply be removed. In another example, the modifications tracking module 214 may write-protect a page (e.g., write-protect the page in the host page tables 129), which would trigger a page fault responsive to a guest's attempt to write to the page. Thus, if a page fault is detected, the hypervisor may determine that the first page has been modified.

Instruction module 216 may cause virtual machine 110A to copy memory page A to a new memory page (memory page C). For example, virtual machine 110A may include a guest device driver (e.g., a virtual driver) that would receive a guest address of memory page A and a guest address of memory page C from hypervisor 120. The virtual machine 110A may then initiate a copying operation, whereby the virtual machine 110A copies the contents from the guest address of memory page A to the guest address of memory page C. In an example, the instruction module 216 instructs the virtual machine 110A to copy memory page A to memory page C. Instruction module 216 may then receive a notification from virtual machine 110A that the instruction was executed by virtual machine 110A (e.g., virtual machine 110A copied memory page A to memory page C).

Mapping component 124 may enable computer system 200 to determine whether to proceed with the moving the host pages to enhance the performance of computer system 200. As illustrated, page mapping component 124 may include a modification checking module 222, and a mapping module 224.

Modification checking module 222 may determine whether memory page A has been modified by virtual machine 110. In an example, the modification checking module 222 may check by determining whether a dirty identifier has been set. In another example, the modification checking module may determine whether a write fault is detected. In response to determining that memory page A has been modified by virtual machine 110, the hypervisor may restart the move process or cancel the move. For example, the hypervisor may begin tracking memory modifications anew, and cause the virtual machine to copy memory page A to a new memory page. The new page may be memory page C or another memory page.

In response to determining that memory page A has been not been modified by virtual machine 110, mapping module 224 may map the guest address of guest page 116B to the host address of host page 128C. Accordingly, memory page A is now mapped to guest page 116B and to host page 128C, and memory page B is mapped to guest page 116C and host page 128D, whereas guest page 116B and 116C are contiguous (e.g., have contiguous addresses in the guest memory), and host page 128C and 128D are also contiguous (e.g., have contiguous host addresses in the host memory), as seen in FIG. 1. Guest page 116E is no longer associated with the first page or the second page. In an example, mapping module 224 may free (un-map or deallocate) guest page 116E from host page 128C. In another example, mapping module 224 may map guest page 116E to host page 128A, which may be set to receive new data. In yet another example, mapping module 224 may map guest page 116E to another unassigned host page.

Accordingly, multiple pages can be mapped by a single page table entry. This reduces the amount of page table walks and space in the TLB used by a VM. It is noted that the hypervisor may perform the re-organization process discussed in FIG. 2 multiple times to set up three or more contiguous guest memory pages mapped to three or more contiguous host memory pages. Thus, the hypervisor may fill a host huge page with contiguous host memory pages that are mapped to contiguous guest memory pages.

Figure 3:
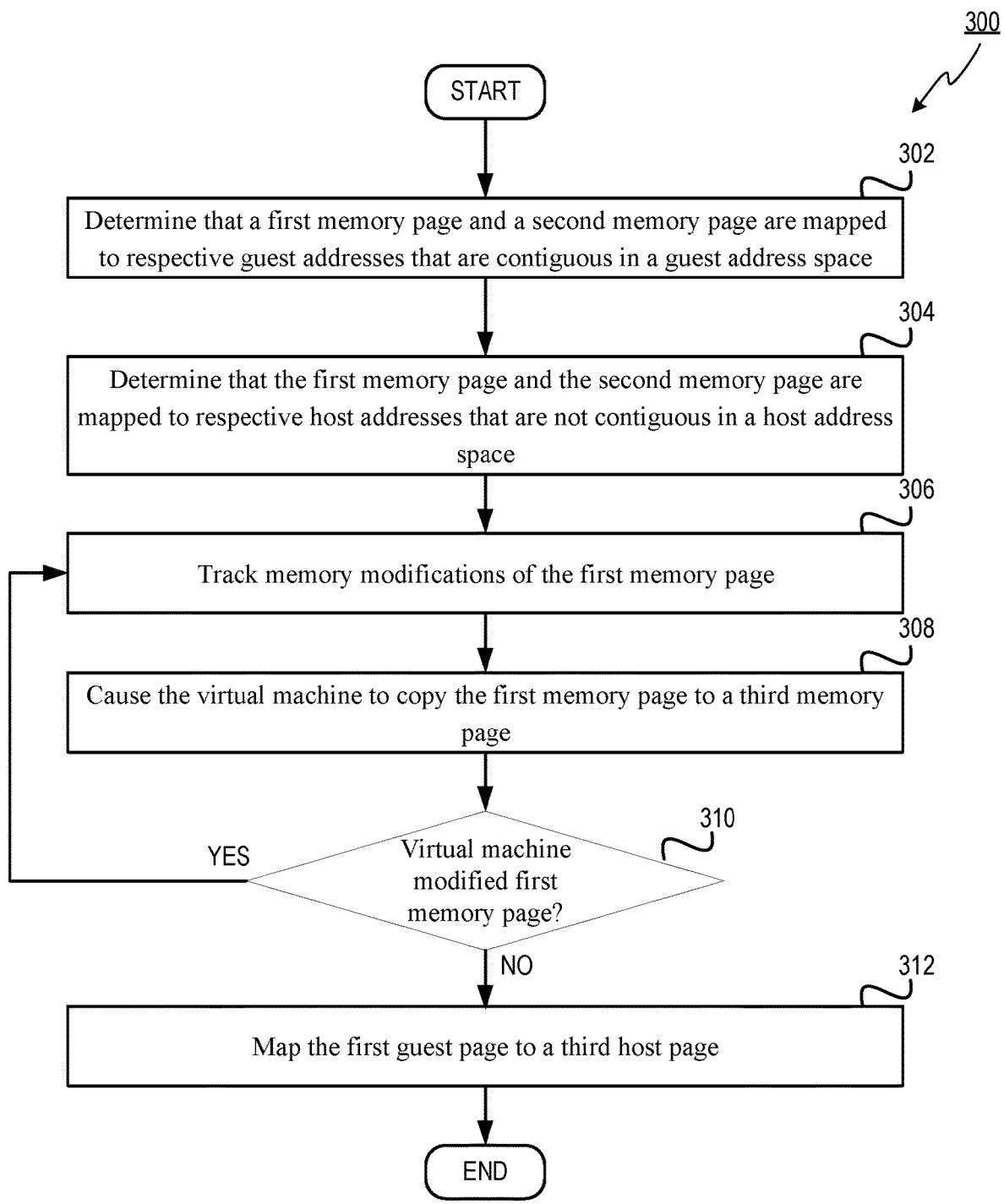
FIG. 3 depicts a flow diagram of an example method for hypervisor memory management, in accordance with one or more aspects of the present disclosure.

FIG. 3 depicts a flow diagram of an illustrative example of a method 300 for virtualized memory management, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 300 may be performed by processing devices of a server device or a client device and may begin at block 302. At block 302, the hypervisor running on a host computer system may determine that a first memory page and a second memory page are mapped to respective guest addresses that are contiguous in a guest address space of a virtual machine running on a host computing system, where the first memory page is mapped to a first guest address and the second memory page is mapped to a second guest address. At block 304, the hypervisor may determine that the first memory page and the second memory page are mapped to respective host addresses that are not contiguous in a host address space of the host computer system, where the first memory page is mapped to a first host address and the second memory page is mapped to a second host address. In an example, the hypervisor may use a translation table of a host page table to determine which contagious guest physical addresses are mapped to not contiguous host physical addresses. The hypervisor may then determine whether a third memory page that is mapped to a third host address contiguous to either the first host address or the second host address is available.

At block 306, the hypervisor may track memory modifications of the first memory page. Tracking the memory modifications of the first memory page may allow the hypervisor to detect if the first memory page is modified. In an example, tracking the memory modifications may include tracking dirty identifiers (e.g., dirty page bits or flags) of the first memory page in a host page table. In another example, tracking the memory modifications may include write-protecting the first memory page in the host page tables, and tracking whether a write fault is detected.

At block 308, the hypervisor may cause the virtual machine to copy the first memory page to a third memory page, such that the third memory page and the second memory page are mapped to respective host addresses that are contiguous in the host address space. For example, virtual machine may include a guest device driver that would receive the guest address of the first page and the guest address of the third page from the hypervisor. The virtual machine may then initiate a copying operation, whereby the virtual machine copies the contents from the first memory to the third memory page. The hypervisor may also receive a notification from virtual machine that the instruction was executed by virtual machine.

At block 310, the hypervisor may determine whether the virtual machine has modified the first memory page. In an example, the hypervisor may determine whether the virtual machine modified the first memory page by checking whether a dirty identifier has been set. In another example, the hypervisor may determine whether the virtual machine modified the first memory page by checking whether a write fault was detected. In response to determining that the virtual machine modified the first memory page, method 300 may end, or may return to block 306. In response to determining that the virtual machine has not modified the first memory page, method 300 may proceed to block 312.

At block 312, the hypervisor may map the first guest address to the third memory page. Accordingly, the third memory page and the second memory page are mapped to respective host addresses that are contiguous in a host address space, and respective guest addresses that are contiguous in a guest address space. Responsive to completing the operations described herein above with references to block 312, the method may terminate.

Figure 4:
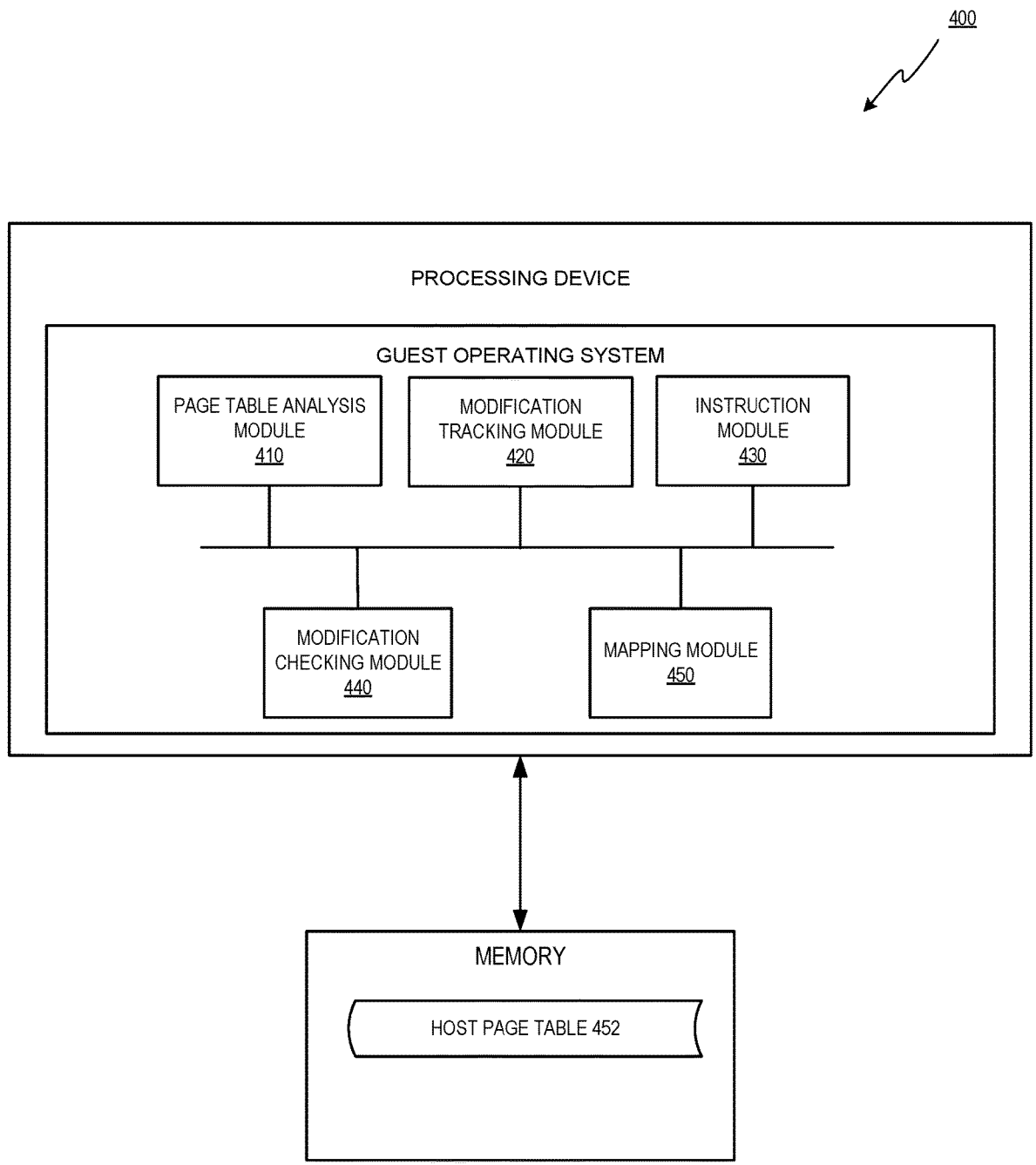
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 200 and computing device 100 and may include one or more processing devices and one or more memory devices. In the example shown, computer system 400 may include a page table analysis module 410, a modification tracking module 420, an instruction module 430, modification checking module 440, a mapping module 450, and a host page table 452.

Page table analysis module 410 may enable the hypervisor to determine that a first memory page and a second memory page are mapped to respective guest addresses that are contiguous in a guest address space of a virtual machine running on a host computing system, where the first memory page is mapped to a first guest address and the second memory page is mapped to a second guest address. The hypervisor may also determine that the first memory page and the second memory page are mapped to respective host addresses that are not contiguous in a host address space of the host computer system, where the first memory page is mapped to a first host address and the second memory page is mapped to a second host address. In an example, the hypervisor may use a translation table of a host page table to determine which contagious guest physical addresses are mapped to not contiguous host physical addresses. The hypervisor may then determine whether a third memory page that is mapped to a third host address contiguous to either the first host address or the second host address is available.

Modification tracking module 420 may enable the hypervisor to track memory modifications of the first memory page. Tracking the memory modifications of the first memory page may allow the hypervisor to detect if the first memory page is modified. In an example, tracking the memory modifications may include tracking dirty identifiers (e.g., dirty page bits or flags) of the first memory page in a host page table. In another example, tracking the memory modifications may include write-protecting the first memory page in the host page tables, and tracking whether a write fault is detected.

Instruction module 430 enable the hypervisor to cause the virtual machine to copy the first memory page to a third memory page, such that the third memory page and the second memory page are mapped to respective host addresses that are contiguous in the host address space. For example, virtual machine may include a guest device driver that would receive the guest address of the first page and the guest address of the third page from the hypervisor. The virtual machine may then initiate a copying operation, whereby the virtual machine copies the contents from the first memory to the third memory page. The hypervisor may also receive a notification from virtual machine that the instruction was executed by virtual machine.

Modification checking module 440 may enable the hypervisor to determine whether the virtual machine has modified the first memory page. In an example, the modification checking module 440 may determine whether the virtual machine modified the first memory page by checking whether a dirty identifier has been set. In another example, the modification checking module 440 may determine whether the virtual machine modified the first memory page by checking whether a write fault was detected. In response to determining that the virtual machine modified the first memory page, the hypervisor may end the re-organization process, or may re-attempt the re-organization process.

In response to determining that the virtual machine has not modified the first guest page, the mapping module 450 may enable the hypervisor to map the first guest address to the third memory page. Accordingly, the third memory page and the second memory page are mapped to respective host addresses that are contiguous in a host address space, and respective guest addresses that are contiguous in a guest address space.

Figure 5:
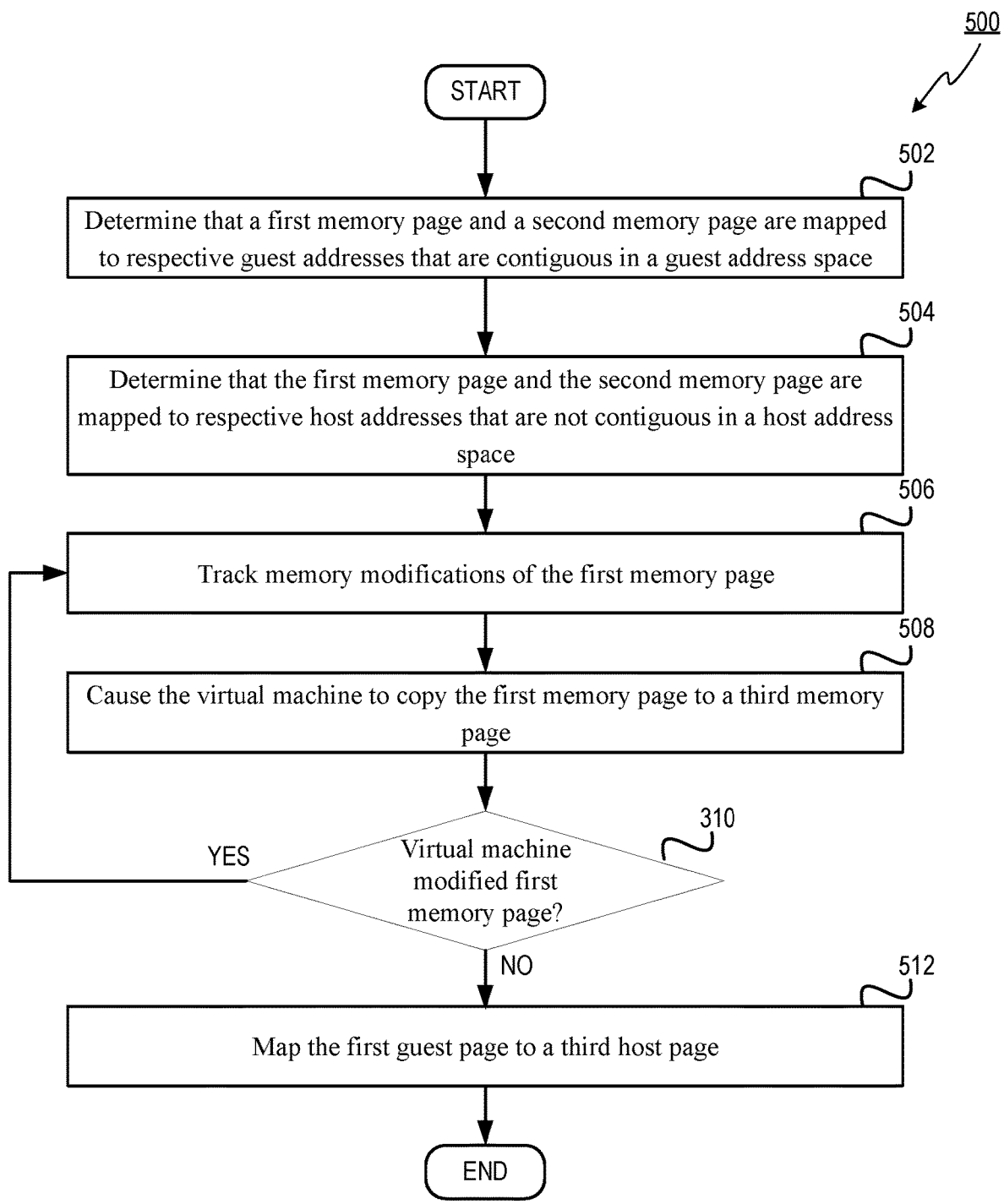
FIG. 5 depicts a flow diagram of an example method for hypervisor memory management for virtual machines, in accordance with one or more aspects of the present disclosure.

FIG. 5 depicts a flow diagram of one illustrative example of a method 500 for virtualized memory management, in accordance with one or more aspects of the present disclosure. Method 500 may be similar to method 300 and may be performed in the same or a similar manner as described above in regards to method 300. Method 500 may be performed by processing devices of a server device or a client device and may begin at block 502.

At block 502, the processing device may determine that a first memory page and a second memory page are mapped to respective guest addresses that are contiguous in a guest address space of a virtual machine running on a host computing system, where the first memory page is mapped to a first guest address and the second memory page is mapped to a second guest address. At block 504, the processing device may determine that the first memory page and the second memory page are mapped to respective host addresses that are not contiguous in a host address space of the host computer system, where the first memory page is mapped to a first host address and the second memory page is mapped to a second host address. In an example, the hypervisor may use a translation table of a host page table to determine which contagious guest physical addresses are mapped to not contiguous host physical addresses. The processing device may then determine whether a third memory page that is mapped to a third host address contiguous to either the first host address or the second host address is available.

At block 506, the processing device may track memory modifications of the first memory page. Tracking the memory modifications of the first memory page may allow the processing device to detect if the first memory page is modified. In an example, tracking the memory modifications may include tracking dirty identifiers (e.g., dirty page bits or flags) of the first memory page in a host page table. In another example, tracking the memory modifications may include write-protecting the first memory page in the host page tables, and tracking whether a write fault is detected.

At block 508, the processing device may cause the virtual machine to copy the first memory page to a third memory page, such that the third memory page and the second memory page are mapped to respective host addresses that are contiguous in the host address space. For example, virtual machine may include a guest device driver that would receive the guest address of the first page and the guest address of the third page from the hypervisor. The virtual machine may then initiate a copying operation, whereby the virtual machine copies the contents from the first memory to the third memory page. The processing device may also receive a notification from virtual machine that the instruction was executed by virtual machine.

At block 510, the processing device may determine whether the virtual machine has modified the first memory page. In an example, the processing device may determine whether the virtual machine modified the first memory page by checking whether a dirty identifier has been set. In another example, the processing device may determine whether the virtual machine modified the first memory page by checking whether a write fault was detected. In response to determining that the virtual machine modified the first memory page, method 500 may end, or may return to block 506. In response to determining that the virtual machine has not modified the first memory page, method 500 may proceed to block 512.

At block 512, the processing device may map may map the first guest address to the third memory page. Accordingly, the third memory page and the second memory page are mapped to respective host addresses that are contiguous in a host address space, and respective guest addresses that are contiguous in a guest address space. Responsive to completing the operations described herein above with references to block 512, the method may terminate. Responsive to completing the operations described herein above with references to block 512, the method may terminate.

Figure 6:
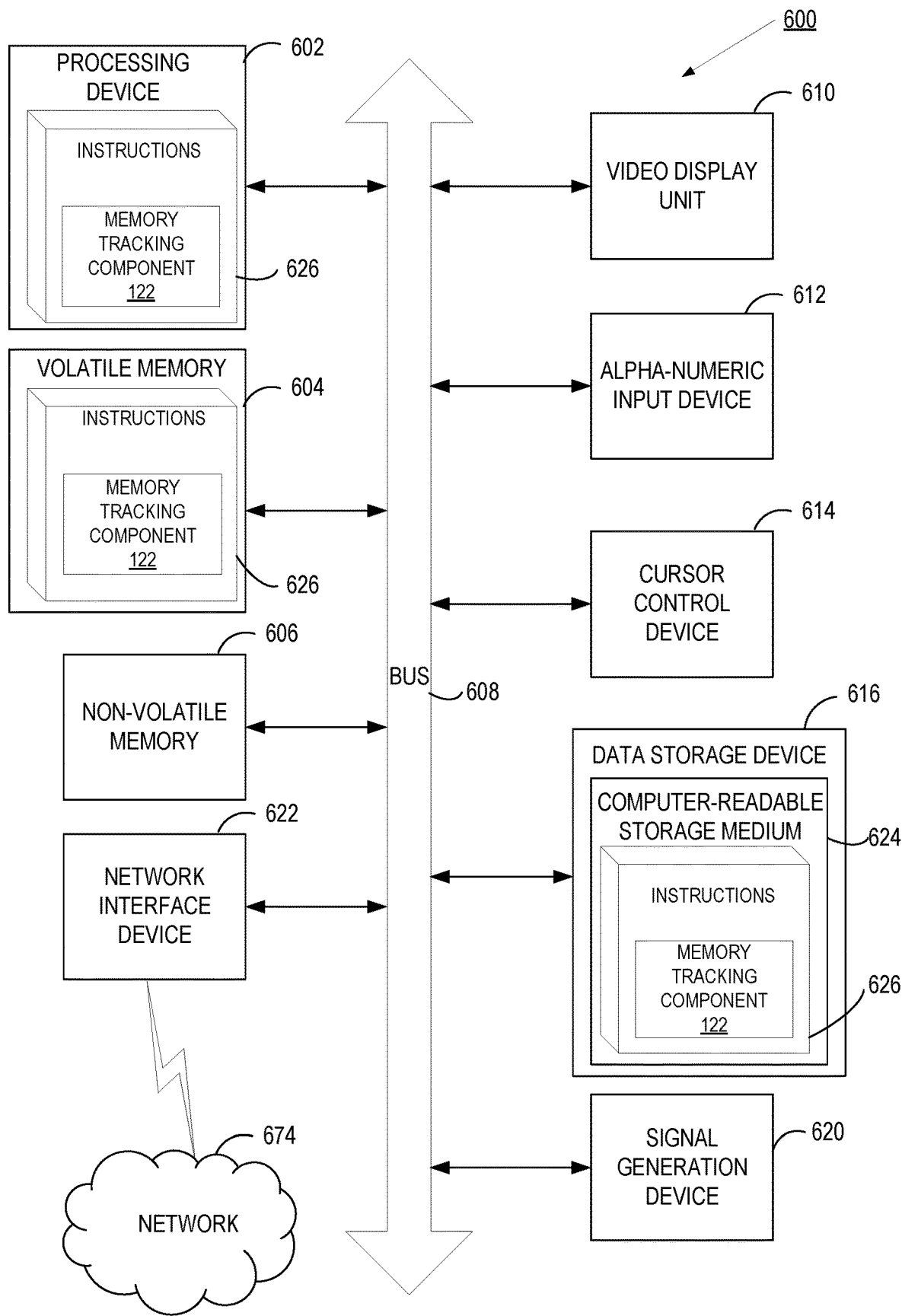
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for memory mapping component 124 (not shown), memory tracking component 122, and modules illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    determining, by a hypervisor of a host computer system, that a first memory page and a second memory page are mapped to respective guest addresses that are contiguous in a guest address space of a virtual machine running on the host computer system, wherein the first memory page is mapped to a first guest address;
    determining that the first memory page and the second memory page are mapped to respective host addresses that are not contiguous in a host address space of the host computer system;
    tracking modifications of the first memory page;
    in response to the tracking modifications, causing the virtual machine to copy the first memory page to a third memory page, such that the third memory page and the second memory page are mapped to respective host addresses that are contiguous in the host address space; and
    in response to determining that the first guest page has not been modified, mapping the first guest address to the third memory page.

2. The method of claim 1, wherein tracking modifications of the first memory page comprises: setting a dirty flag in a page table entry associated with the first memory page.

3. The method of claim 1, wherein tracking modifications of the first memory page comprises: write-protecting the first memory page in a host page table.

4. The method of claim 1, wherein causing the virtual machine to copy the first memory page to a third memory page comprises: transmitting the first guest address and a guest address of the third page to a virtual device driver of the virtual machine.

5. The method of claim 1, further comprising: receiving a notification from the virtual machine that the virtual machine has copied the first memory page to the third memory page.

6. The method of claim 1, further comprising: using a host page table to identify contagious guest physical addresses that are mapped to not contiguous host physical addresses.

7. The method of claim 1, wherein the first memory page and the second memory page are encrypted.

8. A system, comprising:
    a memory;
    a processing device operatively coupled to the memory, the processing device configured to:
    determine that a first memory page and a second memory page are mapped to respective guest addresses that are contiguous in a guest address space of a virtual machine running on a host computer system, wherein the first memory page is mapped to a first guest address;
    determine that the first memory page and the second memory page are mapped to respective host addresses that are not contiguous in a host address space of the host computer system;
    track modifications of the first memory page;
    in response to the tracking modifications, cause the virtual machine to copy the first memory page to a third memory page, such that the third memory page and the second memory page are mapped to respective host addresses that are contiguous in the host address space; and
    in response to determining that the first guest page has not been modified, map the first guest address to the third memory page.

9. The system of claim 8, wherein tracking modifications of the first memory page comprises the processing device being configured to: set a dirty flag in a page table entry associated with the first memory page.

10. The system of claim 8, wherein tracking modifications of the first memory page comprises the processing device being configured to: write-protect the first memory page in a host page table.

11. The system of claim 8, wherein causing the virtual machine to copy the first memory page to a third memory page comprises the processing device being configured to: transmit the first guest address and a guest address of the third page to a virtual device driver of the virtual machine.

12. The system of claim 8, wherein the processing device is further configured to: receive a notification from the virtual machine that the virtual machine has copied the first memory page to the third memory page.

13. The system of claim 8, wherein the processing device is further configured to: use a host page table to identify contagious guest physical addresses that are mapped to not contiguous host physical addresses.

14. The system of claim 8, wherein the first memory page and the second memory page are encrypted.

15. A non-transitory machine-readable storage medium storing instructions that cause a processing device to:
   determine that a first memory page and a second memory page are mapped to respective guest addresses that are contiguous in a guest address space of a virtual machine running on a host computer system, wherein the first memory page is mapped to a first guest address;
   determine that the first memory page and the second memory page are mapped to respective host addresses that are not contiguous in a host address space of the host computer system;
   track modifications of the first memory page;
   in response to the tracking modifications, cause the virtual machine to copy the first memory page to a third memory page, such that the third memory page and the second memory page are mapped to respective host addresses that are contiguous in the host address space; and
   in response to determining that the first guest page has not been modified, map the first guest address to the third memory page.

16. The non-transitory machine-readable storage medium of claim 15, wherein tracking modifications of the first memory page comprises instructions that cause the processing device to: set a dirty flag in a page table entry associated with the first memory page.

17. The non-transitory machine-readable storage medium of claim 15, wherein tracking modifications of the first memory page comprises instructions that cause the processing device to: write-protect the first memory page in a host page table.

18. The non-transitory machine-readable storage medium of claim 15, wherein causing the virtual machine to copy the first memory page to a third memory page comprises instructions that cause the processing device to: transmitting the first guest address and a guest address of the third page to a virtual device driver of the virtual machine.

19. The non-transitory machine-readable storage medium of claim 15, wherein the processing device is further configured to: receive a notification from the virtual machine that the virtual machine has copied the first memory page to the third memory page.

20. The non-transitory machine-readable storage medium of claim 15, wherein the processing device is further configured to: use a host page table to identify contagious guest physical addresses that are mapped to not contiguous host physical addresses.

* * * * *